United States Patent [19]

Tanner et al.

[11] Patent Number: 4,631,400
[45] Date of Patent: Dec. 23, 1986

[54] CORRELATING OPTICAL MOTION DETECTOR

[75] Inventors: John E. Tanner; Carver A. Mead, both of Pasadena, Calif.

[73] Assignee: California Institute of Technology, Pasadena, Calif.

[21] Appl. No.: 572,698

[22] Filed: Jan. 20, 1984

[51] Int. Cl.$^4$ ............................................. G01V 9/04
[52] U.S. Cl. .................................. 250/221; 340/710
[58] Field of Search ............... 358/105, 213; 250/221, 250/578; 356/28; 340/710

[56] References Cited

U.S. PATENT DOCUMENTS

| | | | |
|---|---|---|---|
| 4,270,143 | 5/1981 | Morris | 358/105 |
| 4,296,434 | 10/1981 | Drewery et al. | 358/105 |
| 4,514,726 | 4/1985 | Whetstone et al. | 340/710 |
| 4,521,772 | 6/1985 | Lyon | 340/710 |
| 4,521,773 | 6/1985 | Lyon | 340/710 |
| 4,527,894 | 7/1985 | Geode et al. | 356/28 |

OTHER PUBLICATIONS

Richard F. Lyon, "The Optical Mouse, and an Architectural Methodology for Smart Digital Sensors, Xerox, Palo Alto Research Center, Aug. 1981.

Primary Examiner—David C. Nelms
Assistant Examiner—William L. Oen
Attorney, Agent, or Firm—Freilich, Hornbaker, Rosen & Fernandez

[57] ABSTRACT

An optical mouse utilizing a linear array of photodiodes is provided with circuitry to correlate during each self-timed cycle a new image with a stored image from the previous cycle with the new image offset relative to the stored image one pixel (photodiode signal) to the right, one pixel to the left, and also with no offset. All three correlations are done at the same time in separate correlators. Decision as to motion to the right, to the left or no motion is made on the basis of maximum correlation output. The new image is not stored in a second store array for use during the next cycle until any motion is detected, but it is stored in a first store array during the cycle when half the precharged photodiodes discharge below a predetermined level in response to incident light. A new cycle is initiated by precharging the photodiodes when any decision of motion or no motion is made.

8 Claims, 16 Drawing Figures

FIG. 11a    FIG. 11b    FIG. 11c

CORRELATING OPTICAL MOTION DETECTOR

BACKGROUND OF THE INVENTION

This invention relates to an optical motion detector of the type commonly referred to as a "mouse" because the body, which fits easily in the palm of the hand, is intended to be moved on a desk top with a cable connecting it to a computer resembling the tail of a mouse. The detected motion of the mouse is used as an input to the computer for such purposes as positioning a cursor on an image or text displayed on a cathode ray tube, or as an input to graphics being generated at the computer console.

The mouse is quickly becoming popular. Older mechanical mouse designs are being replaced by new designs that use optics instead of moving parts to detect motion. These optical mice improve the reliability and decrease the intermittent action so common with mechanical mice.

To date, all the optical mouse designs must be moved over a special surface pattern in order to sense their motion properly. One commercially available optical mouse uses a metal plate as a working surface on the desk top with orthogonal grid lines. Lines in one direction reflect infrared and lines in the other direction reflect visible light. Sensors within the mouse that are sensitive to only one color of light can thus detect motion in two directions independently. R. F. Lyon of Xerox Corporation developed an innovative optical mouse that integrated sensors onto the same chip with the processing of optical signals for detection of motion. However, his design requires a working surface consisting of a hexagonal grid of dark dots on a light background. An object of this invention is to relax the requirements on the working surface of the optical mouse. The object is to make an optical motion detector general enough to allow it to work on a wide variety of surfaces like those commonly found on desk tops, thus eliminating the need for a special working surface.

SUMMARY OF THE INVENTION

In accordance with the present invention, an optical motion detector is comprised of a single chip having an array of photodiodes and means for focusing an image onto the chip. The chip also includes an array of storage devices to store an image, and means for correlating pixels of a current image with pixels of a previously stored image, means for determining the position where the correlation is the greatest by correlating the old image in line with the new image and the old image offset one pixel to the right and again offset one pixel to the left of the new image, and a self-timed control means to sequence the operations. The position of correlation with the old image offset to the right or the left indicates the relative motion of the image during the interval between one cycle of storing and correlating an image and the previous cycle. The self-timing is effective upon the total charge of all photodiodes initially charged falling below a predetermined level in response to discharge by leakage current caused by an optical image to assure that the array does not move more than one pixel width during one cycle. A circuit connected to receive the outputs of the correlation means allows each correlation output to inhibit other correlation outputs of lower amplitude to assure a clear decision of the direction of motion, or a decision of no motion.

In a preferred embodiment, a second array for storing an image is provided, and the new image correlated is not transferred from the first store array to the second until a decision is reached that there has been a movement to the left or right. However, every decision of left move, right move or unmoved, is effective to initialize another cycle to receive and store a new image in the first store for correlation. This arrangement reduces the rate of movement that can be detected to zero.

The novel features of the invention are set forth with particularity in the appended claims. The invention will best be understood from the following description when read in connection with the accompanying drawings.

BRIEF DESCRIPTION OF THE DRAWINGS

FIGS. 7a and 7b are plots illustrating the inhibition decision carried out by the circuit of FIG. 6b in accordance with the logic of FIG. 6a.

DESCRIPTION OF PREFERRED EMBODIMENTS

Figure 1:
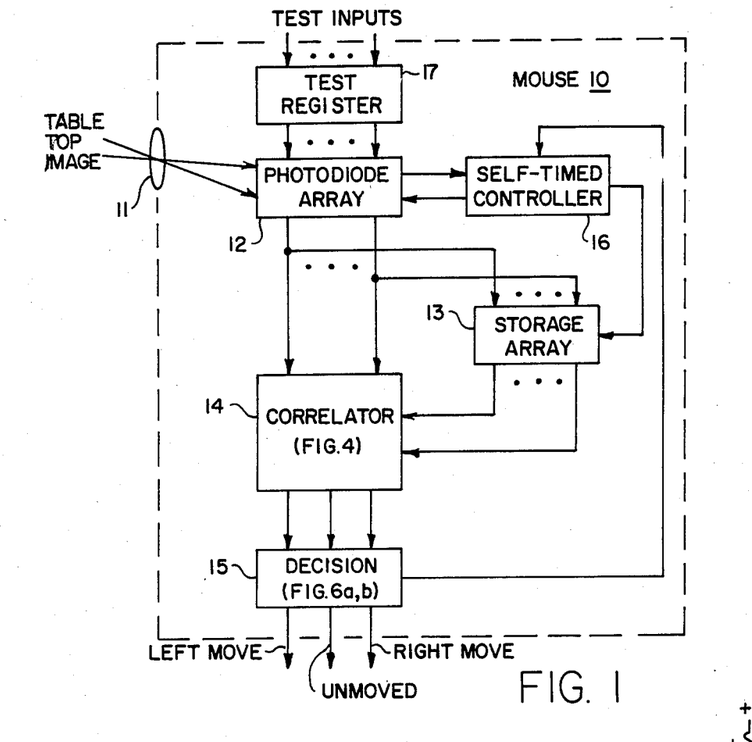
FIG. 1 is a functional block diagram of the present invention using a single linear array of photodiodes.

Referring to FIG. 1, the optical motion detector consists of a single nMOS integrated circuit chip 10 and a lens 11 to project an image onto the chip. FIG. 1 shows the chip in a functional block diagram form. It consists of an array of photodiodes 12 for detecting a light pattern image, a storage array 13 for the image, a correlator 14 to compute the correlation between the stored image and a current one, decision circuitry 15 to determine the direction of motion and a self-timed controller 16 to sequence the entire system. Also included is a test register 17 that can electrically simulate optical images, allowing the chip to be tested for fabrication defects in a conventional nonoptical setting.

Figure 2A:
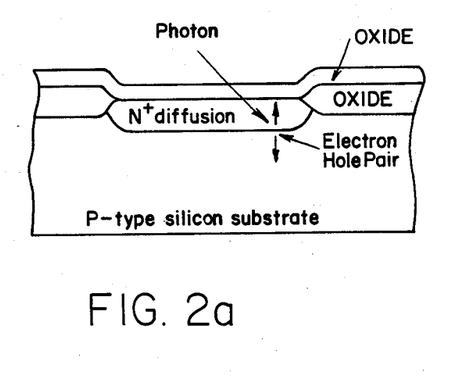
FIG. 2a illustrates a cross section of an nMOS photodiode used in the present invention as a light sensor.
Figure 2B:
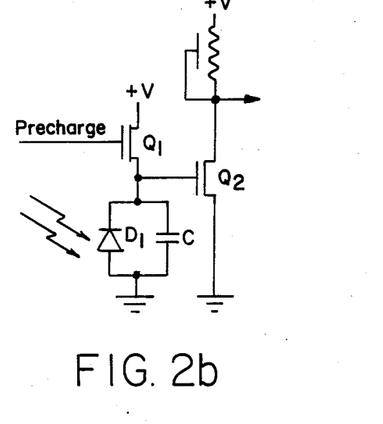
FIG. 2b shows schematically the photodiode of FIG. 2a with an enhancement mode pullup included in an integrated circuit chip with the photodiode and other circuitry necessary for the system of FIG. 1.

The optical transducers are photodiodes implemented in an nMOS integrated circuit chip. In this nMOS chip, a region of N+ diffusion forms a diode with a grounded p-type substrate, as shown in FIG. 2a in a cross section. FIG. 2b represents the photodiode by a reverse biased diode $D_1$ having a capacitor C in parallel. Photons striking the circuit side of the chip forms electron-hole pairs that create a leakage photocurrent through the reverse biased diode. In operation, the diodes of the array are each precharged by a separate enhancement mode FET pull-up switch $Q_1$ which then shuts off leaving them isolated. The diodes then discharge due to the photocurrent at a rate proportional to the intensity of the light striking the diffusion region. Thus for imaging, an array of these photodiodes starts out with all diodes charged. Each photodiode discharges at a rate determined by the intensity of the image at that point. Eventually all diodes are discharged. Associated with each photodiode is a pull-down FET switch $Q_2$, the function of which will now be described with reference to FIG. 3.

Figure 3:
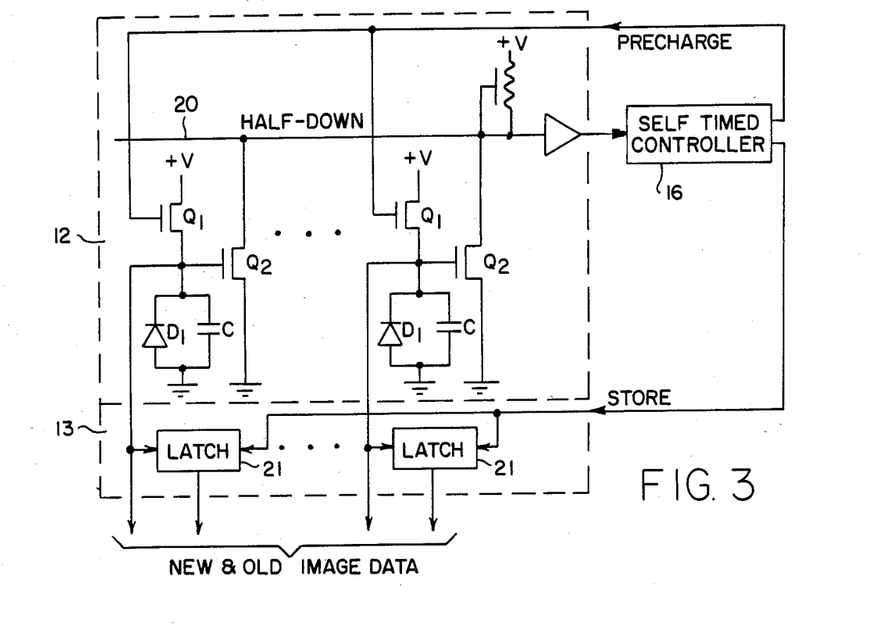
FIG. 3 illustrates for two photocells the arrangement used for self-timing the imaging and storage of pixels during each cycle of operation of the system of FIG. 1.

Charge patterns that reflect interesting properties of the image occur somewhere between the time when all the photodetectors are high and when all of them are low. In this exemplary embodiment of the invention, all photodiodes are sampled and stored at once, at a time when half of them are below a threshold and half of them are above. This approach maximizes the information content in each pixel. The circuitry to accomplish this operation is shown in FIG. 3. There is a global half-down line 20 with a single pull-down FET switch $Q_2$ for each photodiode. When the diodes are all charged high, the pull-down FET switches $Q_2$ are all on. The half-down line is low, with each of the diodes contributing to the pull-down current. As each photodiode discharges and passes the threshold of its pull-down FET switch $Q_2$, the FET switch $Q_2$ turns off, subtracting its current from the total pull-down current. When the total current decreases far enough, the half-down lines goes high. This threshold is chosen by the width/length ratio of pull-up and pull-down FET switches to occur when about half of the photodiodes are down. The rise of the half-down line triggers the self-timed controller 16 which in turn triggers latches 21 of the storage array 13 to end their sampling of the falling photodiode values. Positive feedback in each of the latches turns the stored signal into a restored digital signal for each pixel. The digital image in these latches, one bit per photodiode, is later compared with the next image.

Given two consecutive time samples of an image, the task of motion detection becomes a comparison of the two images. Under the assumption that the object in view has changed relatively little, the images should be nearly the same except for a translation that corresponds to the motion. One method of detecting that motion is to shift one image past the other in both directions, and at each position of the shift, sum the number of bits that match. The position where this sum is the greatest will indicate the direction the image has moved between samples. How much it has moved is a function of the time between samples and the velocity of the mouse. The extent of motion must not exceed the space between diodes for each sample-and-compare cycle.

This comparison and summing process corresponds to a one-dimensional correlation function. The continuous version is given by the formula:

$$C(s) = \int I_0(x) I_1(x+s) dx$$

$I_0$ is the image at time=0, and $I_1$ is the next image sample taken at time=1. The correlation of $I_0$ and $I_1$ is $C(s)$, where s is the amount one image is shifted relative to the other.

The discrete approximation to the correlation function is given by:

$$C(s) = \Sigma_n I_0(n) I_1(n+s)$$

If the motion detector can operate fast enough to guarantee that the fastest motion never moves the image more than one photodiode (pixel) width between two consecutive time samples, then this computation need only be performed within a one pixel neighborhood. The number of correlation values to compute and compare is then only three for the one-dimensional case: $C(s)$ where $s = -1, 0$ and $1$. These values correspond to the image having moved left by one pixel, not having moved, or moved right by one pixel.

Figure 4:
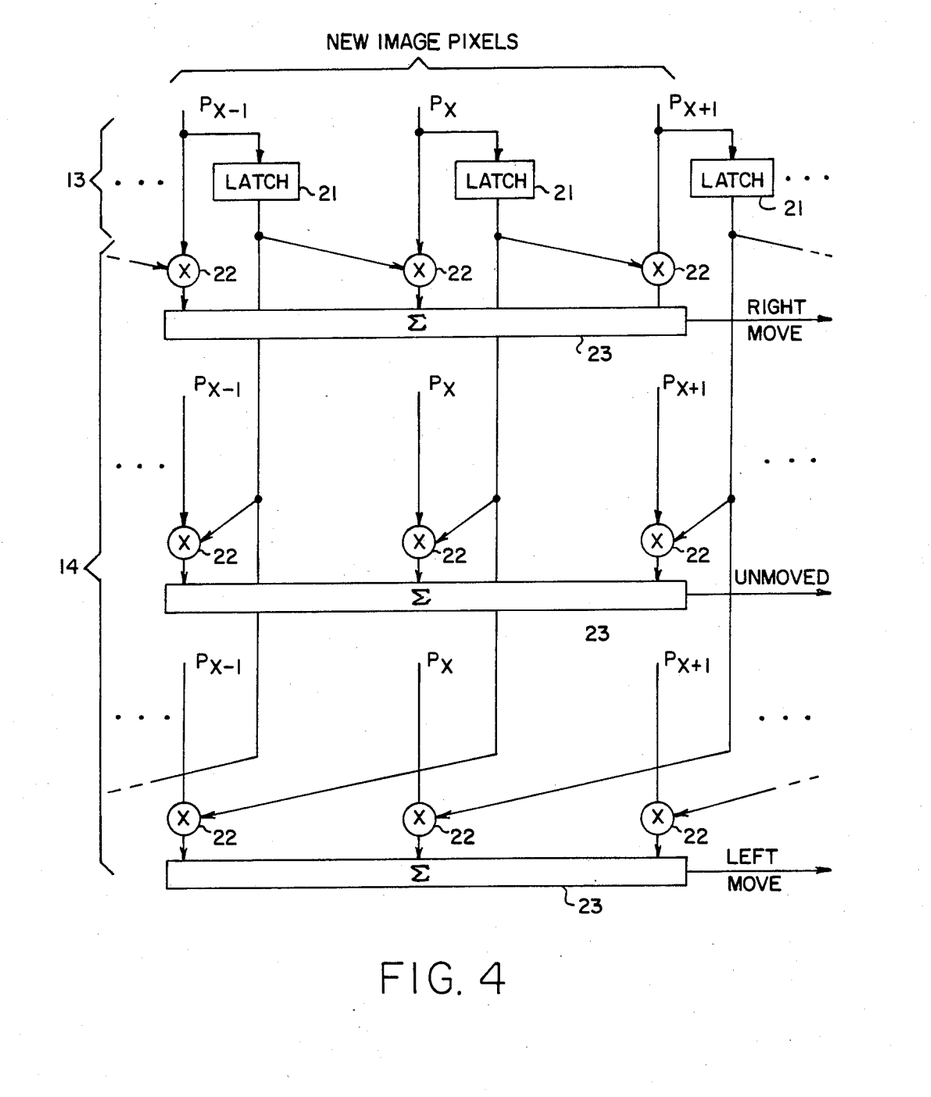
FIG. 4 illustrates schematically the correlation required to detect the direction of motion during each cycle of operation.

The logic diagrams for the correlators are shown in FIG. 4. Each of the three required correlation values are calculated by performing a multiplication of each of the old image pixel values with the corresponding new image pixel values in one bit multipliers 22 and summing the results in a circuit 23. The only difference between the three correlators is the amount the old image pixels are shifted relative to the new image pixels.

When the analog voltages on the light sensors (photodiodes) were stored, much of the light level information was lost. This information was sacrificed for the ability to have long term storage of the image. In the correlation, two consecutive images could be digitized and the correlation performed on them. Instead the present invention retains as much of the analog information as possible and utilizes it in the correlation computation. The correlation is performed between pixels of the previous image, stored as 1-bit digital values, and pixels of the current image which are analog and develop in time from an all high state toward an all low state. The correlation values are thus analog voltages that develop during the cycle as the photodiodes discharge.

Exclusive NOR gates could be used to do the multiplications in the correlation computation. For this case, the individual correlation values within a cycle start out at an intermediate value when the photodiodes are all high, rise to a peak in the middle of the cycle and return to an intermediate value when all the diodes are discharged. To determine which correlation was the greatest would require first finding the peak voltages of each time-varying correlation output and then comparing them. Determining when all the peaks have passed so that the self-timed cycle can start over is a difficult analog circuit problem, especially when the circuits must work with continually changing light on the photodiodes, and must work over several orders of magnitude of speed range.

There is a better way, using AND gates to perform the multiplications. Correlation values using AND multiplication are monotonic as they develop in time from an intermediate value when the photodiodes are all charged to a zero value when the photodiodes are all low. This monotonicity allows the comparison circuitry to be much simpler. Now comparing the correlation values is just seeing which of them goes to zero first. The end of the cycle is much easier to find also. The cycle ends when the first correlation value goes to zero. Circuits to detect this final zero condition are much simpler than circuits to detect the passage of a peak.

It is interesting to note that for motion detection either XNOR gates or AND gates can be used to achieve the same results. The XNOR function is equivalent to multiplication for digital levels assigned the values of 1 and $-1$, while AND gates perform multiplication for values of 0 and 1. The difference between these two ranges is the simple transformation:

$$I_{XNOR} = 2 I_{AND} - 1$$

Substituting this transformation into the correlation equation and simplifying yields the result:

$$C_{XNOR}(x) = 4 C_{AND}(x) + \text{constant}$$

This result shows that for the correlation computation, the difference between using XNOR and AND gates is a simple scaling and translation of the resulting values. Of importance here are the correlation values relative to each other, so either type of multiplier will do just as well. It may seem that the XNOR gate has a built in gain factor of 4 over the AND gate, but in practice, circuit implementation with either gate would scale the results into the same range, an analog voltage between the power and ground supply rails. For simplicity, it is preferred to implement the multiplications using AND gates.

Figure 5:
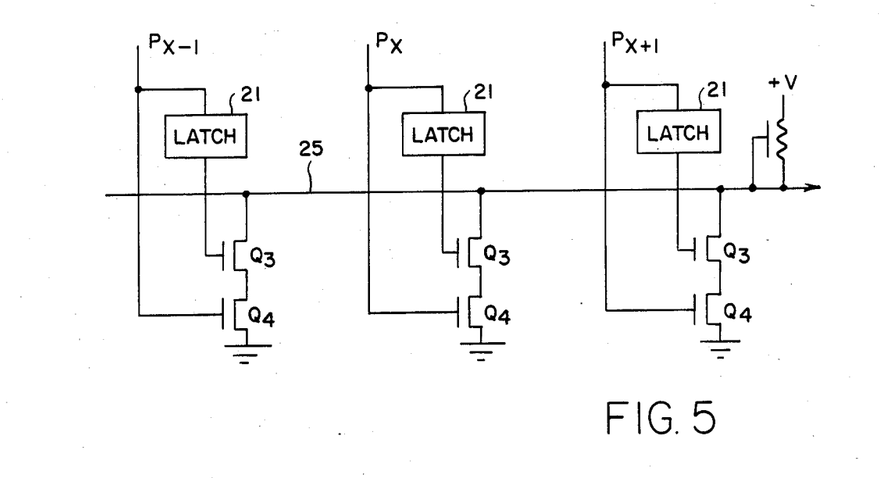
FIG. 5 illustrates how each of the three correlators of FIG. 4 may be implemented.

The circuitry to perform one of the three correlations (the unmoved correlation) is shown in FIG. 5. It consists of a pair of series pull-down FET switches $Q_3$ and $Q_4$ for each pixel that performs the AND function required for the 1 bit multiplication by sinking current when both the old image input and the new image input are high. A global correlation line 25 connecting the pull-down switches performs the current summing function represented by block 23 in FIG. 4.

For the one-dimensional motion detector, there are three correlation lines, as shown in FIG. 4. On one of these lines, the current level indicates the strength of the correlation on the image "moved right" by one pixel. Another indicates the strength of the correlation on the image "unmoved" and the last indicates the strength of the correlation on the image "moved left" one pixel. This three-way correlation is easily implemented by connecting the new and the old pixel output terminals so that the old image is effectively shifted one pixel to the right, not shifted, and shifted one pixel to the left relative to the new image. The currents on these three lines must be compared to determine which of the three possibilities has occurred.

The right move, left move and unmoved correlation lines start at a high current, low voltage state and evolve toward a low current, high voltage state. The voltage state of the line with the greatest correlation will go high before the other two. The ultimate comparison for determining motion is made on this line voltage condition. The comparison is done using mutual inhibition.

Each of the three correlation lines has a rising voltage that is in a race with the other two. The winner of the race is the one to reach a high first. As each line goes high, it inhibits the rise of the other two, pulling them back down. In this way, the final high voltage line is never ambiguous because the only possible final state of the system is with one line all the way high (the winner) and the other two low (being fully inhibited by the winner). If two or more lines are rising at nearly the same rate, the time required for a winner to be chosen is unbounded. The circuit is then in a metastable condition. In that sense, the mutual inhibition circuit may be viewed as a 3-way arbiter.

Figure 6A:
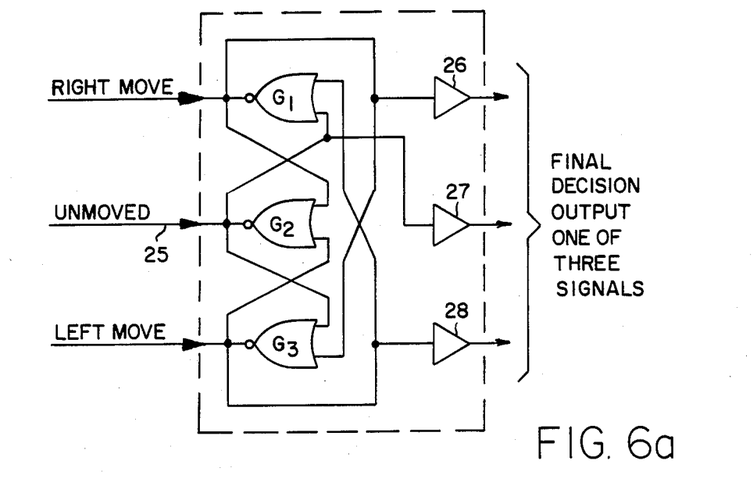
FIG. 6a is a logic diagram of a circuit for determining from the outputs of the correlators of FIG. 4 whether motion is to the right or left, or whether there has been no motion.
Figure 6B:
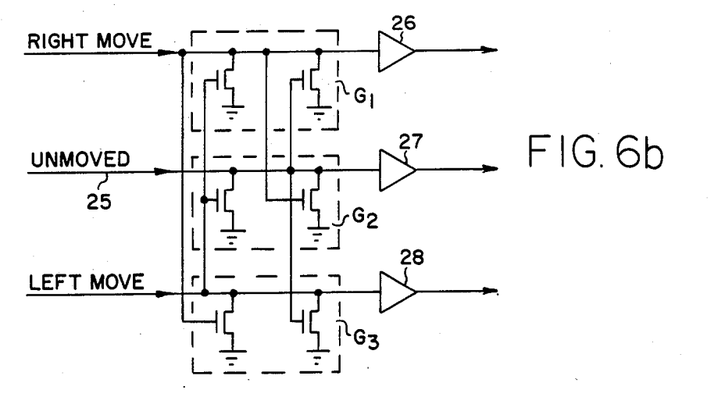
FIG. 6b illustrates a circuit diagram for implementing the logic of FIG. 6a in the nMOS integrated chip of the detector array.

Referring to FIG. 6a, mutual inhibition is implemented by gates $G_1$, $G_2$ $G_3$ cross-coupled to form a three-way NOR flip-flop that starts out in the balanced or "illegal" state of all low. As the three lines are allowed to rise by the correlation circuitry, one of them will rise high enough to begin pulling down the other two. The final state of the circuit will be two lines low and one line high indicating which direction the image has moved (or not moved). When this circuit, identified in FIG. 1 by a block 15 labeled DECISION, falls into one of these stable states, it has "decided" which of the three correlation values was greatest. FIG. 6b shows how the decision circuit may be implemented with six FET transistors in an nMOS integrated circuit.

Figure 7A:
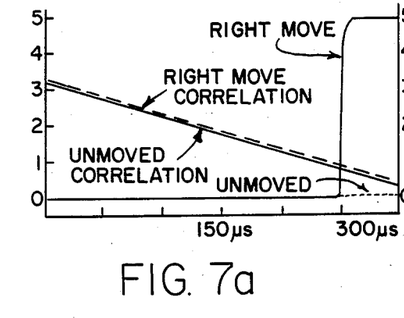
Figure 7B:
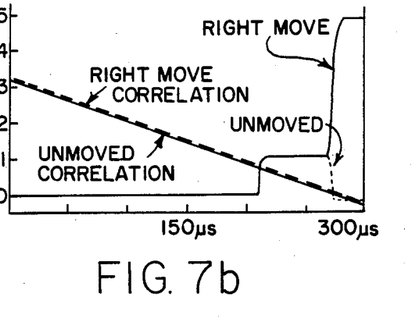

The buffers 26, 27, 28 driven by the three correlation lines must have high enough thresholds so that they are not falsely triggered by the lines rising to their metastable levels. The cross coupling of the gates guarantees that at most one line will rise past the metastable voltage all the way up. FIGS. 7a and 7b show two plots from simulation of the decision three-way flip-flop. In the first (FIG. 7a) the correlation value for the right move is 1.0% higher than that of the unmoved line and the left move line. Here the right line has no trouble winning the race and going all the way high. In the second (FIG. 7b), the correlations are only 0.05% different. Here both lines rise to the point that their mutual inhibition prevents them from rising further. The simulation shows that they hang for more than 50 $\mu$sec near the metastable point before finally one (right move) wins and goes all the way high. (These simulations do not take into account thermal noise or on chip device parameter variations).

The three outputs of the decision circuitry 15 (FIG. 1) buffered by amplifiers 26, 27 and 28 are outputs of the chip. They indicate detected movement by pulsing high from the time the decision is made until the next cycle is begun. These signals can be further encoded on chip for other motion encoding schemes.

Figures 8, 9:
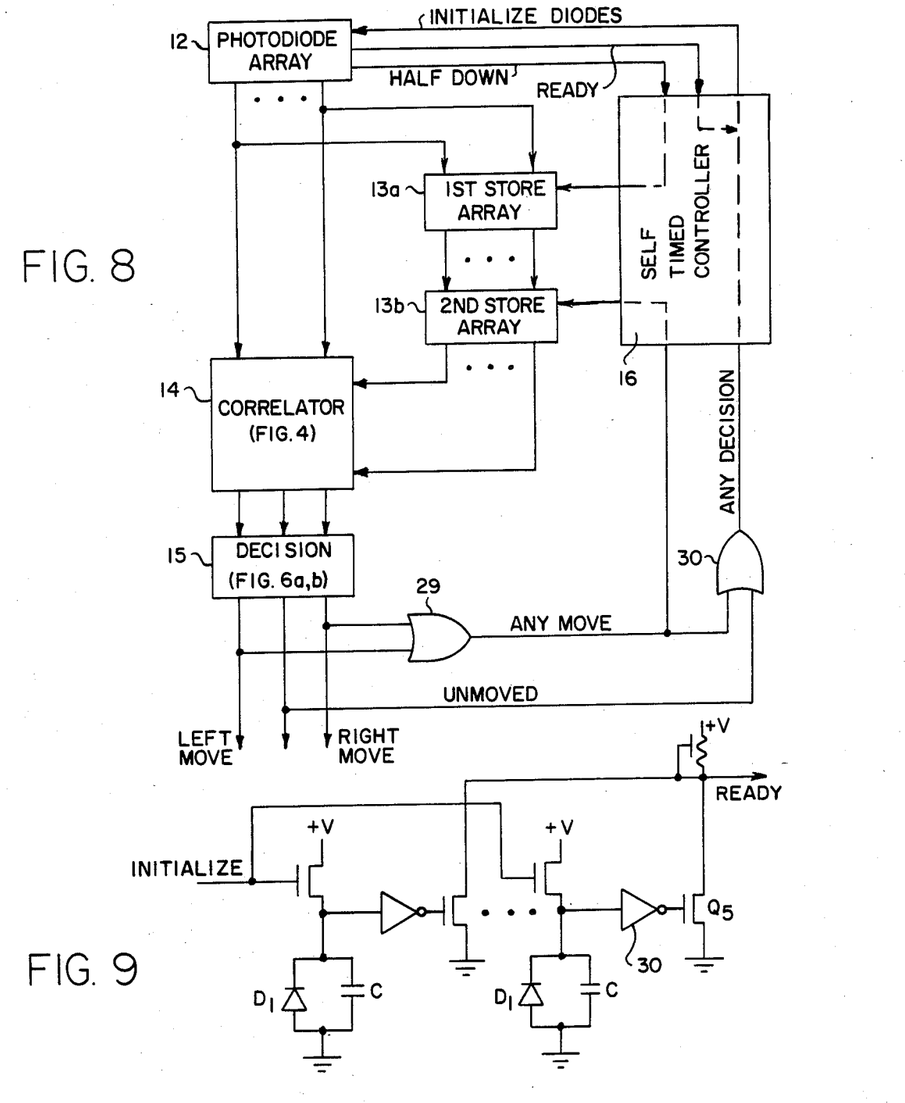
FIG. 8 illustrates the manner in which a twostage latch is provided for each pixel in the storage array of FIG. 1 to conditionally store a new image, and to transfer the new image into the second stage for use as an old image during subsequent correlations only when motion has been detected during the cycle in which there is an image stored in the first stage.
FIG. 9 illustrates the circuit used for generating a ready signal used by the self-timed controller of FIG. 8.

During a cycle there are two independent processes going on. The stored image from the last cycle is being used during the correlation-comparison process, and the current image is being stored for use in the next cycle. Since there is no guarantee that the computation-decision process will finish with the last image before the current image needs to be stored, there must be a two-level store, as shown in FIG. 8. A first store array 13a samples the photodiodes and brings each to a digital level when half-down line 20 reaches a predetermined level. A second store array 13b holds the previous image samples for the correlation computation. The image is transferred from the first store to the second in response to any move made by the decision circuitry via an OR gate 29.

If the image moves by less than half a pixel between samples, the greatest correlation will always be on the unmoved line. If the second store 13b always contains the previous sample, continuous motion at speeds less than half a pixel per sample will never indicate a motion. For each cycle, the best image match will always be for the unmoved position. This occurrence is clearly a problem since the maximum speed of the image is only 1.5 pixels per sample (for a motion detector that only calculates correlation in a 1 pixel neighborhood). A good motion detector should have no minimum velocity, especially not one so close to its maximum velocity. This problem is solved by keeping the old image in the second store $13b$ if an unmoved condition occurs. The only time the new image is moved into the second store used for comparison with successive images is after a movement is detected, as shown in FIG. 8, using the OR gate 29 to trigger the second store if any movement is detected. This technique reduces the minimum velocity of the motion detector to zero.

Since the cycle is self-timed, some circuitry is needed to detect when the photodiodes have all reached their high precharged level. FIG. 9 shows how a distributed NOR gate comprised of FET switches $Q_5$ coupled to the photodiodes $D_1$ by high threshold inverters 30 are used to generate the required ready signal. If any of the diodes are below the threshold, the ready line will be low. When all photodiodes are pulled high enough, the ready line goes high.

Figure 10:
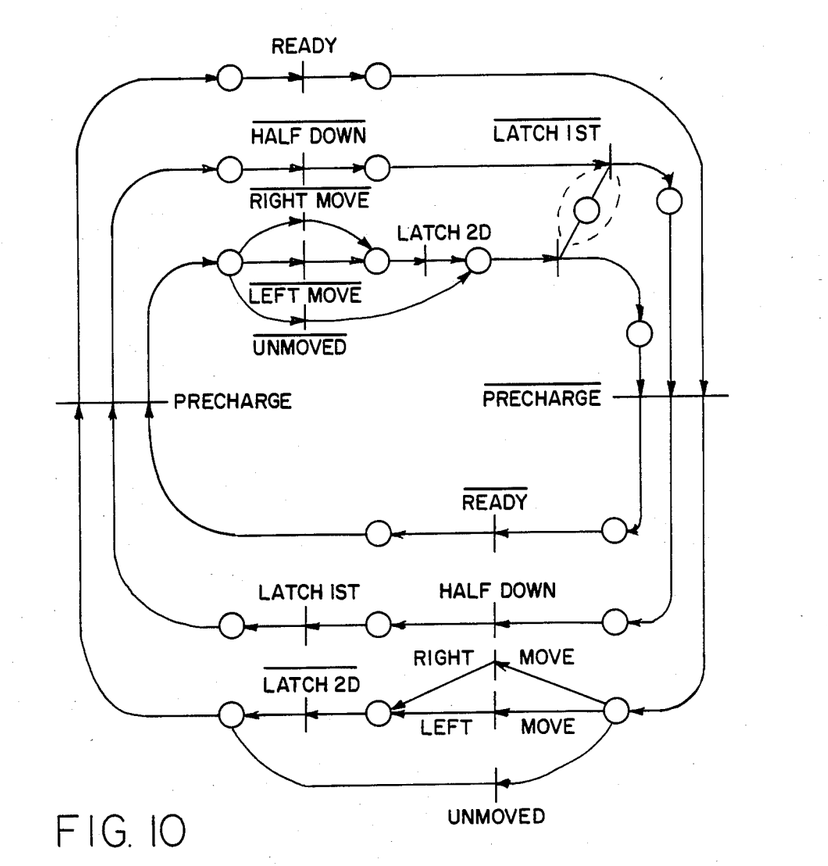
FIG. 10 is a Petri net representation of the motion detector cycle for the self-timed controller of FIG. 8.

A Petri net of the flow of events in the motion detector is shown in FIG. 10. Note that the half-down and ready transitions are not truly independent. The ready line always goes low before the half-down and goes high after the half-down condition. There is an extra pathway, shown by dotted lines, that serves to synchronize the first and second latches. This link guarantees that the image data is transferred to the second store array $13b$ before the first store array $13a$ is cleared in preparation for the next cycle.

It should be noted that the self-timed controller 16 shown in FIG. 8 is represented schematically as simply a "junction box" between controller inputs and outputs, but that in pratice the self-timed controller implements the functions necessary in accordance with the Petri net shown in FIG. 10. Basically, any move triggers the second store array $13b$, and any decision of motion or no motion initializes the photodiode array 12. Following that the ready signal generated in the photodiode array 12 as shown in FIG. 9 will terminate the initializing (upper) part of an imaging cycle shown in FIG. 10. Thereafter, the half-down signal triggers the first store array $13a$, indicated as LATCH 1ST in FIG. 10. The primary selftimed controller function is just that simple, but may in practice be more complex in order to take circuit details into consideration as has been done in the Petri net of FIG. 10. When the photodiodes have been precharged, the ready signal generated will indicate to the self-timed controller that the photodiodes are fully charged so that the imaging part of a cycle may commence, which is the lower half of the Petri net in FIG. 10. The ready signal thus effectively stops the initializing of the photodiodes. When the imaging part of the cycle is done, the output of OR gate 30 again initializes (precharges) the photodiode array. Meantime, if there has been any move, the output of the OR gate 29 transfers the content of the first store array $13a$ to the second store array $13b$.

A one-dimensional motion detector chip was designed and fabricated using a single poly, single metal nMOS process with buried contacts and 4 μm minimum device size ($\lambda = 2$ μm). The chip was $5711 \times 1734$ μm and contained sixteen photodiodes in a linear array. Each photosensor was a diffusion rectangle $200 \times 400$ μm. The chips came packaged in 40 pin packages with cavity covers that could easily be removed to project images onto the chip.

The operating frequency of the optical chip is a function of light level because the discharge rate of the photodiodes is the major delay in the cycle of operation and that rate is proportional to the intensity of the incident light. The operating frequency, f, is given by the equation:

$$f = 1/t = kL$$

where t is the time for one cycle, L is the illuminance of the incident light and k is a constant. Experimental results show that this liner approximation is reasonable over almost three orders of magnitude of light level variation. The theoretical proportionality constant for the frequency/light level relation, k, can be calculated from the unit area capacitance of the diffusion layer and from a conversion between incident light and photocurrent. Depending on the exact assumptions made, k is easily within a factor of 2 of the experimental results. For the chip that was built, a first order approximation shows that frequency varies linearly from about 5 kHz to about 500 kHz for the intensity of light of a flashlight at 3 inches at one extreme and sunlight at the other (lumen/meter$^2$ of flashlight about 50 and of sunlight about 5,000). This range of frequencies will yield a maximum motion tracking speed of about 1 meter per second at one extreme to 100 meters per second at the other extreme.

If the image moves on the chip between image samples farther than the neighborhood of correlation calculation, the motion detector will not accurately report the motion, since the correlation is calculated only to the nearest neighbor, about the width of one diode or about 200 μm. At room light levels, the free running cycle frequency of 10 kHz corresponds to an image velocity of about 2.0 meters/second. The magnification provided by the lens is the ratio of the size of the image on the chip surface to real object. In a mouse application, a magnification of 1 gives a resolution of about 100 points/inch and a maximum mouse speed of 2.0 meters/second.

Figure 11A:
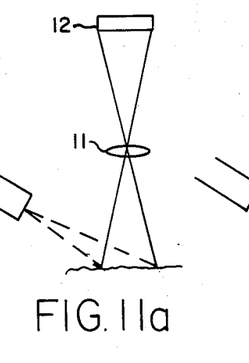
FIGS. 11a, b and c illustrate the effects of optical magnification on resolution and maximum speed.
Figure 11B:
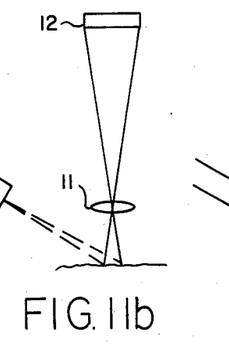
Figure 11C:
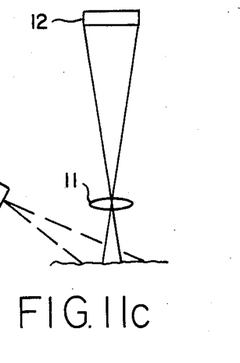

The magnification can be changed by moving the positions of the lens and chip relative to the object. Adjusting the magnification effectively trades off resolution for maximum tracking speed. See FIGS. 11a, 11b and 11c. In FIG. 11a the lens is positioned to image a large illuminated area for high maximum speed, but low resolution. If the lens is positioned closer to the object for imaging a smaller area, as shown in FIG. 11b, and all of the light from the illuminator is concentrated on the imaged area, a high resolution will be achieved, but with a low maximum speed. Should the light from the illuminator cover more area than is being imaged, as shown in FIG. 11c, i.e., if the intensity of the light on the imaged area is reduced, high resolution will be retained, but the maximum speed that the mouse can track is even lower than for the arrangement of FIG. 11b.

Thus it may be appreciated that by correlating the present image from a linear array of photodiodes with the previous image (1) shifted to the right one pixel, (2) not shifted, and (3) shifted to the left one pixel during each self-timing cycle, any motion in either direction of the linear array may be detected. To additionally detect motion in any other direction, such as normal to the linear array just considered, a second array normal to the first may be incorporated together with its complete and independent circuits.

What is claimed is:

1. An optical motion detector comprised of a linear array of photodiodes, means for focusing an image onto said array, means for sampling and storing pixels of said image for correlation with pixels of a new image from said array, at least three distinct correlators, a first correlator in which stored pixels are offset relative to pixels of a new image in one of two directions for detection of motion in said one direction, a second correlator in which stored pixels are not offset relative to pixels of the new image, and a third correlator in which stored pixels are offset relative to pixels of the new image in the second of said two directions for detection of motion in said second direction, and means for detecting which correlator has the greatest value as an indication of direction of motion associated with said first and third correlators in said one direction or said second direction, or no motion when said second correlator has the greatest value.

2. An optical motion detector as defined by claim 1 wherein said last named means includes means connected to the output of each of said correlators and responsive to each correlator output to inhibit the output of other correlators having an output of lower value, thereby to assure that only one correlator has an output that is clearly of greatest value for decision of direction of motion.

3. An optical motion detector as defined by claim 1 including timing means for sequencing the storage of said new image in said pixel storing means for correlation with pixels of a subsequent image at a rate fast enough to assure that said array does not move more than the width of one pixel between two consecutive image samples.

4. An optical motion detector as defined by claim 3 wherein said timing means includes means for initializing an image sampling sequence by charging a capacitance associated with said photodiodes of said array and means for storing pixels of a sampled image when the charge of half the photodiodes of the array fall below a predetermined level, and half are above said predetermined value.

5. An optical motion detector as defined by claim 4 wherein said last named means includes means connected to the output of said correlators for each correlator output to inhibit the output of other correlator means of lower correlation value, thereby to assure that only one correlator has an output that is clearly of greatest value for decision of direction of motion.

6. An optical motion detector comprised of a linear array of photodiodes; means for focusing an image onto said array; first means for storing pixels of said image once during each self-timed cycle of operation; second means for storing pixels from said first storing means for correlation with pixels of a new image during the next cycle only after movement is detected in a cycle; three distinct correlators, a first correlator in which stored pixels are offset relative to pixels of a new image in one direction for detection of motion in said one direction, a second correlator in which stored pixels are not offset relative to pixels of the new image, and a third correlator in which stored pixels are offset relative to pixels of the new image in another direction, means for detecting which correlator has the greatest correlation value as an indication of direction of motion associated with said first and third correlators in said one direction or the other direction, or no motion when the correlation value of said second correlator is greatest; means responsive to said greatest correlation value detection means for transferring stored pixels from said first storage means to said second storage means in response to any movement detected in either direction, and means for initiating another cycle when any decision of movement in either direction, or no movement, is made by said detecting means.

7. An optical motion detector as defined in claim 6 wherein a cycle is initiated by precharging photodiodes in said array in response to any decision by said detecting means, and pixels of said image are stored in said storage means when the charge in half of said photodiodes is discharged below a predetermined level by incident light and the other half are still charged above said predetermined level.

8. An optical motion detector as defined in claim 6 including means connected to the outputs of said three correlators for each correlator output to inhibit the output of other correlators of lower correlation value, thereby to assure that only one correlator has an output that is clearly of greatest value for decision of any motion and direction of motion.

* * * * *